United States Patent [19]
Reising

[11] Patent Number: 5,845,827
[45] Date of Patent: Dec. 8, 1998

[54] AERODYNAMIC COVER FOR AUTOMOTIVE VEHICLE RACKS

[76] Inventor: Laurence A. Reising, 3313 168th Place S.E., Bellevue, Wash. 98008-5731

[21] Appl. No.: 828,739

[22] Filed: Mar. 20, 1997

Related U.S. Application Data

[60] Provisional application No. 60/015,888, Apr. 22, 1996.

[51] Int. Cl. [6] .................................................... B60R 9/00
[52] U.S. Cl. ........................... 224/316; 224/309; 224/319
[58] Field of Search .................................... 224/309, 316, 224/319; 244/1 N, 123, 130; 280/304.4; 296/180.1–180.5; 446/61, 62, 94, 31, 32; 114/102, 103, 243; 180/903; 37/266

[56] References Cited

U.S. PATENT DOCUMENTS

| | | | |
|---|---|---|---|
| 1,315,356 | 9/1919 | Willard | 114/243 |
| 4,105,220 | 8/1978 | Pacific | 280/304.4 |
| 4,819,132 | 4/1989 | Hwan et al. | 296/180.1 |
| 5,013,081 | 5/1991 | Cronce et al. | 296/180.1 |
| 5,456,199 | 10/1995 | Kernkamp | 114/111 |
| 5,490,621 | 2/1996 | Dixon et al. | 224/319 |
| 5,544,434 | 8/1996 | Calvachio, Jr. | 37/266 |

*Primary Examiner*—David J. Walczak
*Assistant Examiner*—Timothy L. Maust
*Attorney, Agent, or Firm*—Christensen O'Connor Johnson & Kindness PLLC

[57] ABSTRACT

A cover for covering a cross-member of an automotive vehicle rack has a body and a hole. The body has a rounded leading edge and a tapered trailing edge. The hole extends longitudinally through the length of the body and is sized to receive a cross-member. In a further embodiment, the body also has a slit extending radially outwardly from the hole to an outer surface of the cover and extending longitudinally along the length of the body providing a passage through which a cross-member may slide into the hole.

20 Claims, 2 Drawing Sheets

AERODYNAMIC COVER FOR AUTOMOTIVE VEHICLE RACKS

This application claims the benefit of U.S. Provisional Application Serial No. 60/015,888, filed Apr. 22, 1996.

FIELD OF THE INVENTION

The invention relates to automotive vehicle racks, and more particularly to aerodynamic covers for automotive vehicle racks.

BACKGROUND OF THE INVENTION

People often desire to transport large objects such as sports equipment including bicycles, kayaks, or snow skis. Generally these objects are of such dimension that they do not fit within the interior or the trunk of a passenger vehicle. Unless transportation by truck is arranged to transport these objects, people generally attach them to the top or back of their passenger vehicle. However, securing such objects directly onto the exterior of the vehicle typically entails risk of damage to either the vehicle or the objects. Objects secured directly to the exterior of the vehicle may vibrate or shift during the operation of the vehicle possibly scratching the vehicle's finish or even damaging the vehicle's body. The objects may also sustain similar damage.

To minimize the potential for damage, a rack is generally attached to the exterior of the vehicle. The objects are then attached to the rack rather than directly to the vehicle. Using racks minimizes or eliminates any contact between the object and the vehicle, thereby minimizing the potential for damage. Racks also are generally configured to allow objects to be easily attached to the exterior of the vehicle.

Automotive vehicle racks typically include rigid structural frames. The frames are generally secured to the vehicle so they do not move or shift. The frames typically include one or more members that extend from one side of the vehicle to the other. The objects to be carried are typically fastened to the cross-members. In some instances, the objects are secured directly to the cross-members. Alternatively, the object can be secured to another support frame which is secured to the cross-members.

The cross-members of automotive vehicle racks are generally constructed of circular or rectangular tubes. Such tubes are readily available and may be purchased or fabricated fairly inexpensively. In addition, it is fairly easy to fabricate connecting brackets to attach additional support frames to the rectangular or circular cross-members, for example, for bicycle or ski racks.

Although cross-members with circular or rectangular cross-sections have many advantages, they have less than desirable aerodynamic characteristics. When a vehicle with a rack is in motion, high velocity air flows over the cross-members. When the air flow is of a high enough speed, the air stream becomes turbulent and the flow separates from the surface of a cross-member, increasing drag.

Present automotive rack designs also present potential problems with personal injury. Cross-members are formed of stiff, rigid materials. In some instances, cross-members extend beyond the side of the car, thus presenting the potential for a person's head to hit the end of the cross-member.

As seen from the above discussion, there exists a need for improved vehicle racks. The present invention is directed toward meeting this need.

SUMMARY OF THE INVENTION

The present invention is a cover for cross-members of automotive vehicle racks. The cover is comprised of a body having a rounded leading edge and a tapered trailing edge and a hole extending longitudinally through the length of the body. The hole is sized to receive a cross-member of a vehicle rack. Preferably, the apparatus is constructed of a resilient, lightweight, flexible and durable material such as foam.

In one embodiment of the invention, a slit extends radially outward from the interior of the hole to an outer surface of the cover. The slit extends longitudinally through the length of the cover. For installation or removal of the cover, the slit is spread open, thereby providing a passage through which the cross-member of the vehicle rack can slide into and out of the hole. The cover can be of any length. In accordance with other aspects of the invention, the cover may be constructed with regions of material having different density or colors.

The aerodynamic design of the invention helps prevent air flow separation as air passes over the cross-member during vehicle operation. In addition to reducing drag, the aerodynamic shape minimizes the potential for formation of a Karmen vortex. Noise and vibration are thus reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
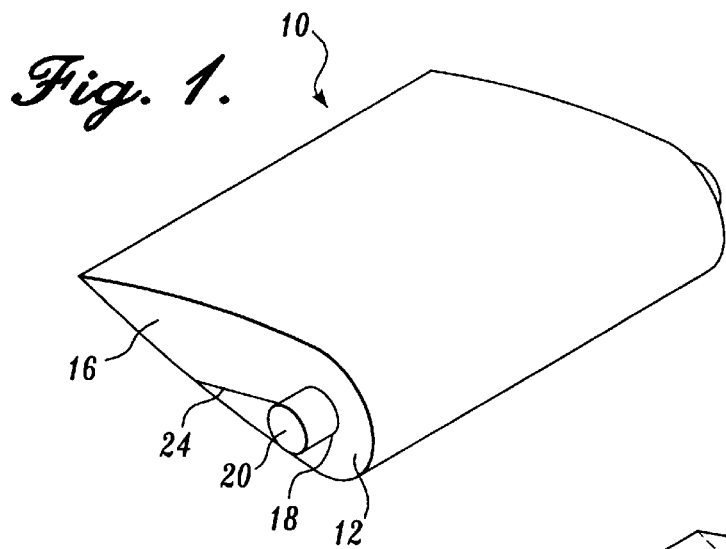
FIG. 1 is a perspective view of a preferred embodiment of the invention installed on an automotive vehicle rack cross-member.

The preferred embodiment of an aerodynamic cover in accordance with the present invention is shown in FIG. 1. The preferred embodiment comprises a cover 10 through which an installation hole 18 is defined. The cover 10 has a leading edge 12 and a trailing edge 16. When the cover 10 is installed on a cross-member 20 of an automotive vehicle rack, the leading edge 12 faces the front of the vehicle and the trailing edge 16 faces the rear of the vehicle.

The cover 10 has an aerodynamic cross-section with a curved leading edge 12 and a tapering trailing edge 16. In alternative embodiments, the leading edge 12 could also be in the form of a taper.

As shown in FIG. 1, the cover 10 is installed over a cross-member 20 of an automotive vehicle rack. The cross-member 20 illustrated has a circular cross-section. However, the invention can also be configured for use with cross-members that are square, rectangular, or other shapes.

Figure 2:
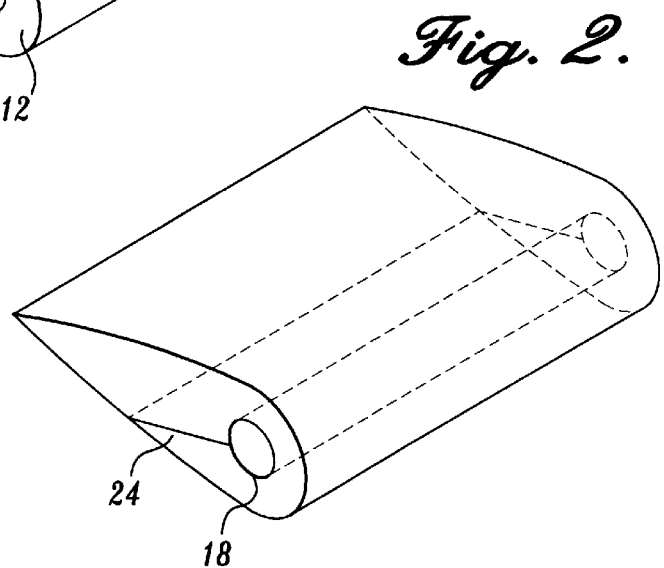
FIG. 2 is a perspective view of the embodiment of FIG. 1.

In some instances, the cover 10 can be slid over the end of cross-member 20. In other cases, the cross-member 20 does not have free ends but has brackets or support frames keeping the cover 10 from being slid over the cross-member 20. In such cases, the cross-member 20 includes an installation slit 24 that allows the cover 10 to be placed over the cross-member 20. The installation slit 24 extends from the interior of the hole 18 through the outside of the cover. Both the slit 24 and the hole 18 extend longitudinally through the length of the cover 10 as shown in broken lines in FIG. 2. It should be noted that the cover 10 can be of any length. The length of the cover 10 is preferably sized to match the length of cross-member 20. If there are attachments or brackets on the vehicle rack, the cover 10 can be cut into several shorter lengths and installed around the attachments. During installation or removal of the cover 10, the slit 24 is spread open thereby providing a passage through which a cross-member 20 or other structural member of an automotive vehicle rack can slide into or out of the hole 18. The hole 18 is sized for cover 10 to fit snugly over the cross-member 20 to prevent the cover 10 from twisting.

The cover 10 can be manufactured from a variety of resilient materials, including foams, plastic, wood, etc. The preferred embodiment is constructed of a lightweight, flexible and durable material such as a flexible foam.

Foam of differing types and densities may be used to construct the cover. However, the preferred embodiment is formed of closed cell polyethylene foam or closed cell crosslinked polyethylene foam having a density between 2 and 6 lbs/ft3. Low density foams have the advantages of being lightweight and flexible. However, the foam used should not be so flexible in that it is prone to detach itself from the vehicle rack when the vehicle is at operating speeds. Foams of higher densities are stronger and more durable, but preferably should be flexible enough to install over the cross-member. To increase durability, it is advantageous to use a closed-cell polyethylene foam or to coat at least a portion of the outside surface of the foam with a protective layer 60 (FIG. 6B) made of rubber or plastic material.

Foam materials are advantageous because they are lightweight and are unlikely to cause damage or injury to vehicles or pedestrians if the cover comes off the vehicle during operation. Foams also can be readily cut and modified to fit around brackets or other features of the vehicle rack on which the cover is installed. Foam covers of the invention help protect both the vehicle rack and any equipment installed onto the cross-members, such as sailboards, kayaks, skis, etc.

Figure 3:
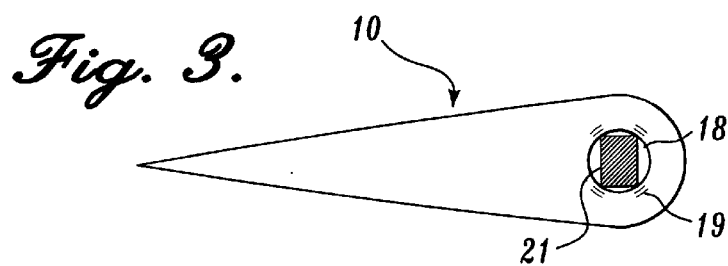
FIG. 3 is a side view of the cover installed on a rectangular cross-member of rectangular cross-section.

FIG. 3 illustrates the cover 10 installed over a rectangular cross-member 21. The rectangular cross-member 21 extends through the length of the cover. The corners of the cross-member 21 compress the adjacent foam 19 of the cover 10, thereby helping prevent the cover 10 from twisting on the cross-member. Accordingly, the diameter of the hole 18 is sized so that the surface of the hole conforms to the exterior shape of the cross-member as the cover 10 is inserted over the cross-member.

The cover 10 can also be constructed without an installation slit, as shown in FIG. 3. For installation, a cross-member 21 is inserted through the hole 18 for the length of the cover and thereafter the rack is assembled.

Figure 4:
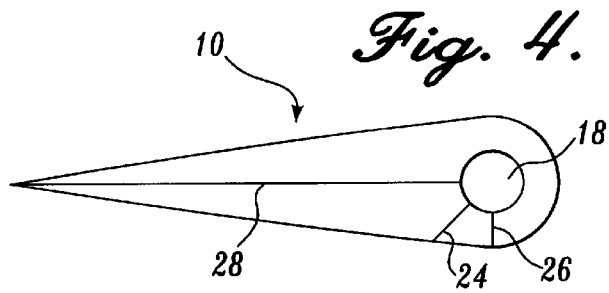
FIG. 4 is a side view of another embodiment of the cover.

As illustrated in FIG. 4, the slit may extend in a variety of orientations. For example, the slit may extend from the hole 18 to the outside of cover 10 at an acute angle to the plan of the cover, at an angle perpendicular to the plan of the cover, or parallel to the plan of the cover as illustrated by slits 24, 26, and 28.

Figure 5A:
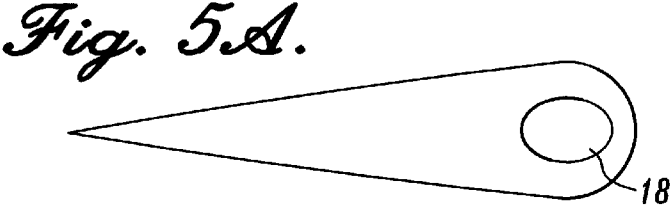
FIGS. 5A–5D are side views of yet other alternative embodiments of the cover.

FIGS. 5A–5D illustrate still other embodiments of the invention. In the embodiment of FIG. 5A, the installation hole 18 has an oval cross-sectional shape. Such a hole is capable of receiving a cross-member 20 or other structural member of any cross-section, circular, rectangular, or otherwise.

Figure 5B:

FIG. 5B illustrates another variation on the cross-sectional shape of installation hole 18. In this instance, installation hole 18 has a rectangular cross-section. An installation hole of rectangular cross-section is optimally sized when the interior periphery of the hole coincides with the outer surface of a cross-member placed therein. The use of a rectangular hole 18 on a cross-member 21 having a rectangular cross-section helps prevent rotation of the cover 10 around the cross-member 21.

Figure 5C:

FIG. 5C illustrates yet another variation on the cross-sectional shape of hole 18. In this instance, the hole 18 has a cross-section perimeter that follows the outer periphery of a combination circle 30 and a rectangle 32 superimposed on one another.

Figure 5D:
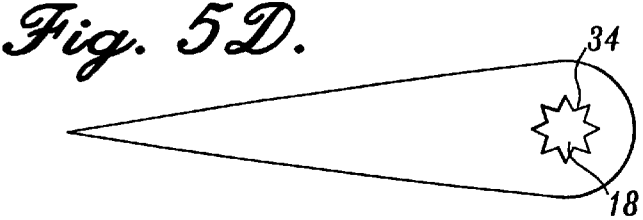

Finally, FIG. 5D illustrates installation hole 18 having a multi-faceted star-shaped cross-section 34 generally characterized by radially inwardly extending portions of the body for making contact with a cross-member. Such a hole is capable of receiving a cross-member of any cross-section, circular, rectangular, or otherwise.

Figure 6A:
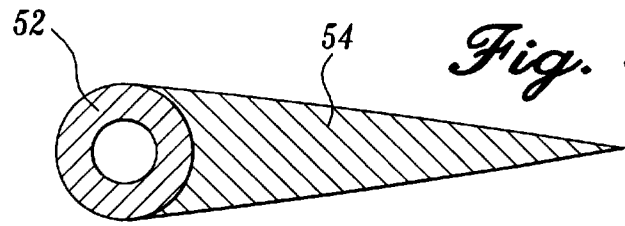
FIGS. 6A and 6B are cross section of further embodiments of the invention.
Figure 6B:
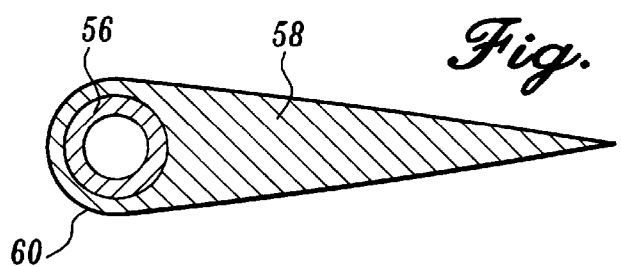

In an alternate embodiment of the invention, it may be advantageous to construct the cover with different materials or with regions of differing density. For example, in FIG. 6A, a leading edge 52 may be constructed of higher density material, thus providing it with greater durability. To reduce the overall weight of cover 10, a trailing edge 54 may be constructed with lower density material. In a similar fashion, another embodiment of the invention may include a region of material 56, adjacent to and surrounding the hole, having a different density than the material 58 used to construct the remainder of the cover, as seen in FIG. 6B. The cover 10 may be formed of materials of differing density by using a dual durometer extrusion process or other processes known in the art.

It should also be appreciated that the cover may also be formed of different materials of differing color. Referring again to FIG. 6A, the leading edge 52 may be a different color than the trailing edge 54.

In further embodiments of the present invention, the cover 10 may be advantageously formed with adhesive material on the opposing surfaces of the installation slit 24 or on the inside of the hole 18. Such an adhesive material helps to bond the slit 18 together or bond the cover to the cross-member thereby preventing the cover 10 from being easily removed.

While the preferred embodiment of the invention has been illustrated and described, it will be apparent that various changes can be made therein without departing from the spirit and scope of the invention.

The embodiments of the invention in which an exclusive property or privilege is claimed are defined as follows:

1. A cover for covering a cross-member of an automotive vehicle rack, the cover, in an unmounted state, comprising:
   a body having a rounded leading edge and a tapered trailing edge, and
   a hole extending longitudinally through the length of the body, the hole being sized to receive a cross-member and the peripheral wall of the hole torsionally securing the body to the cross-member, the cover substantially covering the cross-member when the cover is mounted on the cross-member.

2. The cover of claim 1, wherein the body is made of a resilient material.

3. The cover of claim 2, wherein the resilient material is closed cell polyethylene foam.

4. The cover of claim 1, wherein the cross-section of the hole transverse to the longitudinal axis of the body is round.

5. The cover of claim 1, wherein the cross-section of the hole transverse to the longitudinal axis of the body is rectangular.

6. The cover of claim 1, wherein the cross-section of the hole transverse to the longitudinal axis of the body is shaped by the outer periphery of a combined circle and a rectangle superimposed on one another.

7. The cover of claim 1, wherein the cross-section of the hole transverse to the longitudinal axis of the body is multi-faceted starshaped.

8. The cover of claim 1, further comprising a slit extending radially outward from the interior of the hole to an outer surface of the cover, the slit extending longitudinally along the length of the body in the tapered trailing edge, the slit being sized to allow a cross-member to slide through the slit into the hole.

9. The cover of claim 8, wherein the slit is oriented at an acute angle to the plan of the cover.

10. The cover of claim 8, wherein the slit is oriented parallel to the plan of the cover.

11. The cover of claim 8, wherein the slit is oriented at an angle perpendicular to the plan of the cover.

12. The cover of claim 8, wherein the cover is formed with an adhesive material on a surface of the slit.

13. The cover of claim 1, wherein the leading edge is constructed of material having a different density than material used to construct the trailing edge.

14. The cover of claim 1, wherein a region of the body adjacent to and surrounding the hole is constructed of material having a different density than the material used to construct the rest of the body.

15. The cover of claim 1, wherein the leading edge is constructed of material having a different density than material used to construct the trailing edge.

16. A cover for covering a cross-member of an automotive vehicle rack, the cover comprising:

a body having a rounded leading edge and a tapered trailing edge, and a hole extending longitudinally through the length of the body, the hole being sized to receive a cross-member, the cover further comprising a slit extending radially outward from the interior of the hole to an outer surface of the cover, the slit extending longitudinally along the length of the body, the slit being sized to allow a cross-member to slide through the slit into the hole, wherein the cover is formed with an adhesive material on the inside of the hole.

17. A cover for covering a cross-member of an automotive vehicle rack, the cover comprising:

a body constructed of a foam material, the body having a rounded leading edge and a tapered trailing edge, a hole extending longitudinally through the length of the body, the hole sized to receive a cross-member and the peripheral wall of the hole torsionally securing the body to the cross-member, and a layer of water-resistant material coating at least a portion of the outside surface of the body.

18. The cover of claim 17, wherein the layer is comprised of a rubber material.

19. The cover of claim 17, wherein the layer is comprised of a plastic material.

20. A cover for covering a cross-member of an automotive vehicle rack, the cover comprising:

a body constructed of a foam material, the body having a rounded leading edge and a tapered trailing edge, a hole extending longitudinally through the length of the body, the hole being sized to snugly receive a cross-member, a slit extending radially outward from the interior of the hole to an outside surface of the cover, and wherein the body of foam material can be temporarily deformed along the slit, thereby opening the slit and allowing the cross-member to slide through the slit into the hole.

* * * * *